United States Patent [19]

Davies et al.

[11] Patent Number: 4,502,224

[45] Date of Patent: Mar. 5, 1985

[54] SELF LEVELING DEVICE

[75] Inventors: Alan Davies, Union; Joseph H. McCabe, III, Morristown; Steven J. Kopil, Bridgewater, all of N.J.

[73] Assignee: E. W. Saybolt & Co., Inc., Kenilworth, N.J.

[21] Appl. No.: 503,382

[22] Filed: Jun. 10, 1983

[51] Int. Cl.³ .............................................. G01C 7/06
[52] U.S. Cl. ...................................... 33/1 V; 33/293; 33/DIG. 1
[58] Field of Search ................... 73/149; 33/1 V, 392, 33/293, DIG. 1

[56] References Cited

U.S. PATENT DOCUMENTS

| 3,826,576 | 7/1974 | Stewart . | |
|---|---|---|---|
| 3,874,088 | 4/1975 | Shaffer, Jr. . | |
| 3,940,858 | 3/1976 | Perotti | 33/293 X |
| 3,985,356 | 10/1976 | Carlock . | |
| 3,988,837 | 11/1976 | Benson . | |
| 4,085,512 | 4/1978 | Bod et al. | 33/293 |

FOREIGN PATENT DOCUMENTS 2608  1/1983  Japan ..................... 33/1 V

Primary Examiner—Harry N. Haroian
Attorney, Agent, or Firm—Jordan and Hamburg

[57] ABSTRACT

A self leveling adapted to be moved along a substantially vertical wall comprises a base assembly adapted to be moved up and down along the substantially vertical wall, a roller assembly pivotally connected to the base assembly to be in continuous contact with the vertical wall, and weight means pivotally connected to the roller assembly. The leveling device is further provided with a horizontal member connected to the weight means perpendicular to an imaginary vertical line extending through the weight means.

10 Claims, 6 Drawing Figures

SELF LEVELING DEVICE

BACKGROUND OF THE INVENTION AND PRIOR ART STATEMENT

The present invention relates to a self leveling device, more particularly an automatic leveling device adapted to be moved vertically along a vertical wall, which is especially suitable for calibrating the capacity of a cylindrical tank by measuring outer radiuses thereof.

In industrial areas, there are many hugh cylindrical tanks which are generally intended to store liquid or gas. For the sake of accuracy in the buying and selling of the liquid or gas, it is necessary to know the exact volumetric capacity of each tank relative to the height to which the tank is filled so that the exact volumetric content of the tank in relation to the level to which the tank is filled will be known.

When the tank is built, the capacity of the tank theoretically may be calculated based on the construction drawings. However, in actuality, especially as time goes by, metal deformation takes place in the tank due, for example, to the pressure exerted on the tank walls by the tank contents, so that the tank capacity gradually changes. Therefore, it is desired periodically to check the tank capacity. This involves taking measurements and making mathematical calculations. It is necessary for this purpose to know the actual radiuses of the tank at various locations thereof.

If the tank is cylindrical, the tank is imaginarily cut into many horizontal sections, and the circumference is measured for each section. The radius of each section of the tank is calculated from the circumference, so that the capacity of the tank can be calculated.

In measuring the outer circumference of a cylindrical tank, there has commonly been used a method in which a metal measuring tape is positioned around the horizontal section. The metal tape can be situated horizontally at the bottom of the tank. However, it is almost impossible to situate the tape horizontally around the tank at high places from the ground, since at such places it is not possible for anyone to walk around the tank and adjust the tape. Therefore, the tape measuring method is less accurate than desired.

Another method, more recently developed, is called the "optical reference line method". In this method, a reference circumferential line is at first exactly horizontally provided near the bottom of the cylindrical tank, and the length of the reference line is exactly measured. The tank is imaginarily cut into many horizontal sections as in the tape measuring method, and the circumference of each section is measured with reference to the reference line of the tank by means of an optical device already known.

In particular, when the optical method is used, as shown in FIGS. 1-3, there are required a winch 10 situated on a tank T, a target device 11 with a scale 12 to be moved vertically along the vertical wall of the tank T by means of a line 13 attached to the winch 10, and an optical instrument 14 situated outside the tank T. The optical instrument 14 used herein comprises a sighting telescope 17 for reading a value on the scale 12, the instrument 14 being known in the measuring field and, therefore, not being described in detail in the present specification.

The target device 11 is, as stated above, at its upper end connected to the line 13 and a tail rod 15 is pivotally connected to its bottom end. A wheel 16 is rotationally connected to the tail rod 15 for continuous contact with the vertical wall of the tank T. The scale 12 is connected to the tail rod 15 perpendicular thereto at the position where the wheel 16 is connected to the rod 15. Therefore, the scale 12 indicates the distance from the vertical wall of the tank T when the wheel 16 contacts the wall.

In carrying out the optical method, a circumferential, horizontal reference line $L_1$ is at first determined near the bottom of the tank T. The reference line $L_1$ may be a metal tape as used in the tape measuring method, and the length of the reference line $L_1$ is exactly measured. Other imaginary, circumferential horizontal lines, for example, $L_2-L_7$ are provided on the tank T, the lines $L_2-L_7$ being equally spaced. Further, the circumference of the tank T is divided into, for example, eight imaginary, vertical lines $A_1-A_8$.

The winch 10 is located on the tank T so that the line 13 is situated slightly radially outwardly (relative to the axis of the tank T) spaced from one of the imaginary vertical lines, for example $A_1$. In this position, the winch 10 is operated for moving the target device 11 vertically. First, the scale 12 is located at the reference line $L_1$ and is moved upwardly to be located, in turn, at $L_2-L_7$. When the optical method is performed, the optical instrument 14 is located outside the tank T with the line of sight of the telescope 17 preferably approximately on a tangent to the tank T at points on the vertical line $A_1$. The telescope 17 of the instrument 14 is pivotable about both horizontal and vertical axes so it can be aimed at the scale 12 of the target device 11 for reading the scale 12. The optical instrument 14 is levelled (by known conventional means) so that the vertical pivot axis of the telescope 17 is on a line corresponding to a plumb line. With the scale first located at the level of the reference line $L_1$ the telescope 17 is aimed at an arbitrary point (preferably approximately midway) on the scale 12 and the numerical value at that point is recorded. The telescope 17 is locked to prevent further pivoting about the horizontal axis but is still free to pivot about the vertical axis.

When the target device 11 is then moved and the scale 12 is, in turn, located at the level of each of the lines $L_2-L_7$, respective numerical values on the scale 12 are determined and recorded by aiming the telescope 17 at the scale 12 by pivoting the telescope 17 upwardly about the horizontal pivotal axis. Differences in the numerical values $A_1L_1 \ldots A_1L_7$ respective are due to irregularities in the configuration, i.e. deformation of the tank T.

After the numerical values for the vertical line $A_1$ are obtained, the winch 10 is moved in order to superimpose the line 13 over the vertical line $A_2$. Also, the optical instrument 14 is moved, and re-levelled, so that the line of sight of the telescope 17 is approximately tangential to points on the line $A_2$.

Then, numerical values on the scale 12 for locations $A_2L_1 \ldots A_2L_7$ are obtained. In this manner, a numerical value for each of the AL coordinates is determined.

After all the numerical values are obtained, the average numerical value for each of lines $L_1-L_7$ is calculated, viz., by adding the values for each location $A_1L_1$, $A_2L_1, \ldots$ and $A_8L_1$, and then dividing by 8 (number of vertical lines) and doing likewise for each other level. The average numerical values $l_1 \ldots l_7$ relate to radius of the tank T at each corresponding level. Since the actual radius $R_1$ corresponding to $L_1$ is calculated based on actual measurement of the circumference $L_1$, actual radiuses $R_2 \ldots R_7$ corresponding to $L_2 \ldots L_7$ are indicated as follows:

$$R_2 = R_1 + (l_2 - l_1)$$

$$R_3 = R_1 + (l_3 - l_1)$$

$$R_4 = R_1 + (l_4 - l_1)$$

$$R_5 = R_1 + (l_5 - l_1)$$

$$R_6 = R_1 + (l_6 - l_1)$$

$$R_7 = R_1 + (l_7 - l_1).$$

The capacity of the tank T is calculated based on $R_1 \ldots R_7$ considering thickness of the tank wall and other factors relating to the tank T. Such details are well known to persons working in this field and are described, for example, API Standard 2550 (ASTM Designation D 1220-65).

The self leveling device of the present invention is used instead of the target device 11 in carrying out the above optical reference line method. The substitutions of the self leveling device of the present invention for prior art target device 11 results in certain advantages. For example, in the conventional target device, when the vertical wall of the tank T is inclined, although the wheel 16 is always in contact with the inclined surface, the scale 12 is not oriented horizontally, because the scale 12 is oriented perpendicular to the wall of the tank T. The scale 12 inclines in accordance with the inclination of the wall of the tank T. Accordingly, the numerical value on the scale 12 obtained by means of the optical device 14 departs from the true value needed for a precise calculation of the tank capacity. Further, if it is windy, the target device 11 moves or swings. Consequently, the optical method cannot be carried out.

Accordingly, an object of the invention is to provide a self leveling device adapted to be used in the optical reference line method for calibrating a tank capacity, in which the outer configuration of the tank can be precisely measured.

Another object of the invention is to provide a self leveling device as stated above, which can be properly positioned on the wall of the tank regardless of wind conditions.

A further object of the invention is to provide a self leveling device as stated above, which can be readily manufactured.

A still further object of the invention is to provide a self leveling device as stated above, which can be manipulated easily without deviation.

Further objects and advantages of the invention will be apparent from the following description of the invention.

SUMMARY OF THE INVENTION

In accordance with the present invention, a self leveling device of the invention is adapted to be moved up and down an upright, usually vertical or approximately vertical wall of, for example, a tank. The leveling device comprises a base assembly adapted to be moved up and down the wall, a roller assembly pivotally connected to the base assembly so that the roller assembly is always in contact with the wall, and weight means pivotally connected to the roller assembly. The leveling device is further provided with a horizontal member connected to the weight means perpendicular to an imaginary vertical line extending through the weight means.

The base assembly comprises a frame adapted to be connected to a line for raising and lowering the frame, and at least two wheels rotationally connected to the frame. The wheels help the frame to smoothly move along the wall at a predetermined distance therefrom. The base assembly preferably includes magnet members on the frame, which are effective for biasing the frame and forcing the wheels against the wall by magnetic force if the wall is constituted of a ferromagnetic material. Consequently, the frame is not blown about, even by strong winds. The spacing of the magnet members from the wall on which the base assembly rides can be adjusted for regulating the strength of the magnetic force.

The roller assembly of the leveling device comprises a roller support pivotally connected to the frame and a contact roller rotationally connected to the roller support. The contact roller is larger in diameter than the wheels of the base assembly so that the contact roller is always in engagement with the wall.

The weight means comprises a weight support pivotally connected to the roller support and a weight element connected to a bottom of the weight support. Consequently, as the contact roller moves along the surface of the wall, the weight support always orients exactly vertically. As a result, the horizontal member, which is preferably a scale, orients exactly horizontally.

DETAILED DESCRIPTION OF THE PREFERRED EMBODIMENT OF THE INVENTION

Figure 1:
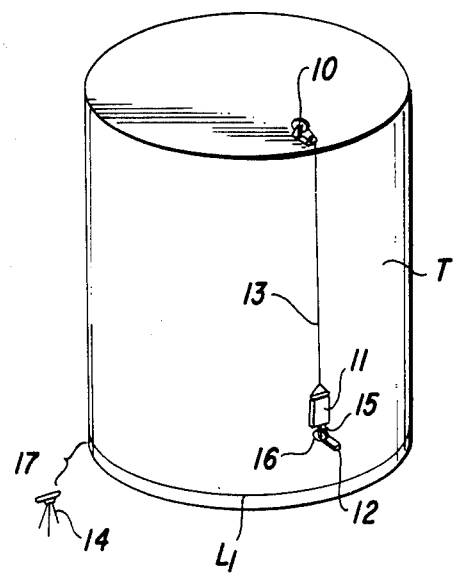
FIG. 1 is a perspective view of a tank together with equipment for conducting the conventional optical reference line method for calibrating the content of a tank.
Figure 2:
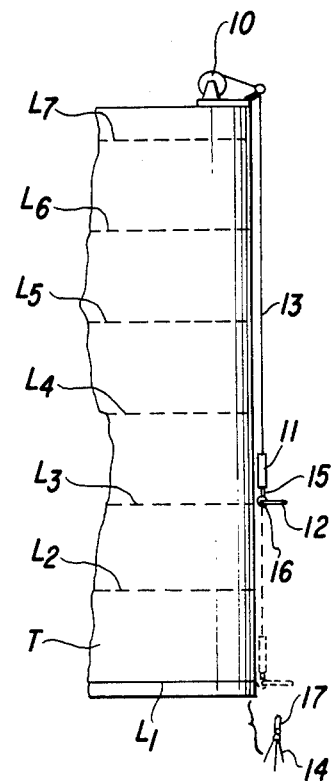
FIG. 2 is a fragmented side elevation of the tank and equipment of FIG. 1.
Figure 3:
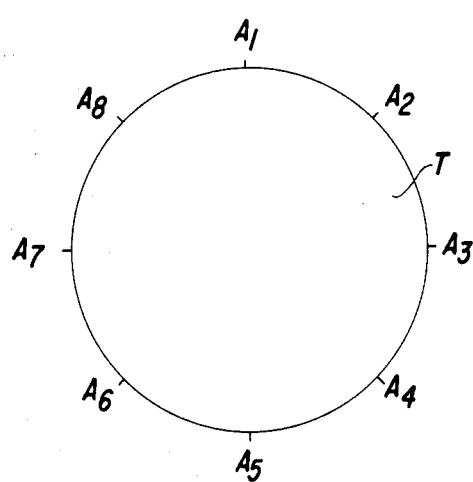
FIG. 3 is an explanatory plan view of the tank of FIG. 1 (without and calibrating equipment)
Figure 4:
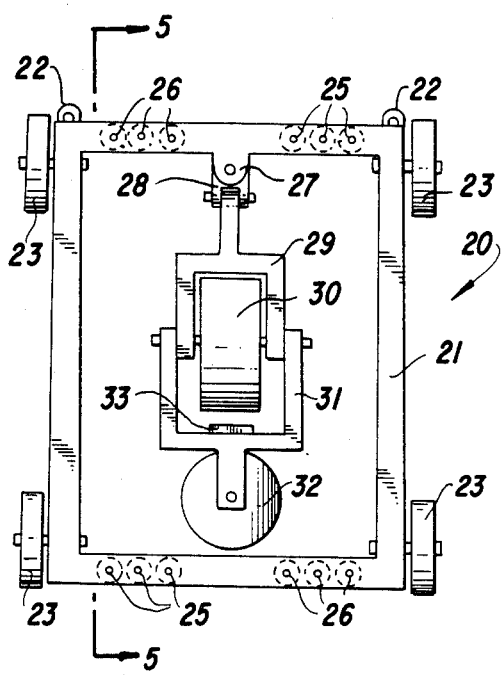
FIG. 4 is a plan view of a self leveling device in accordance with the present invention for use in the optical reference line method for calibrating the capacity of a tank.
Figure 5:
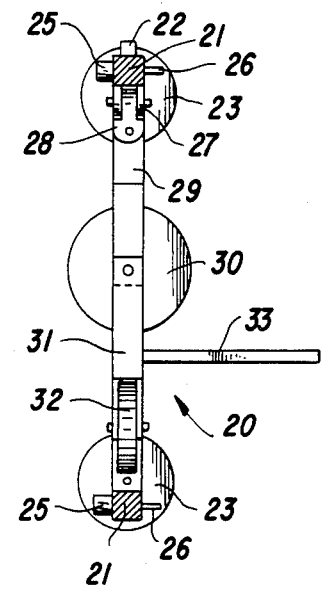
FIG. 5 is a section view taken along a line 5—5 in FIG. 4.
Figure 6:
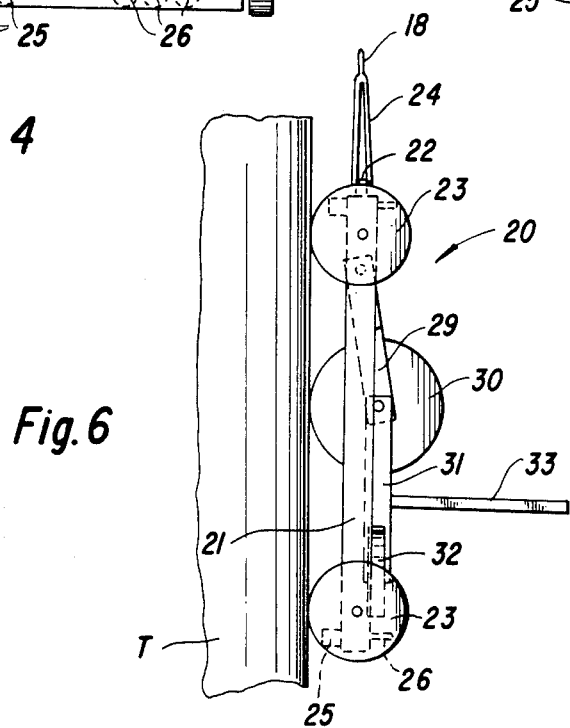
FIG. 6 is a side view of the self leveling device of FIGS. 4 and 5 being used in performing the optical reference line method.

Referring to FIGS. 4-6, a self leveling device 20 in accordance with the present invention is shown, which is used in carrying out the optical reference line method for calibrating the capacity of the tank T.

The leveling device 20 comprises a rectangular frame 21 having two loops 22 at an upper end, and four wheels 23 rotationally connected to the frame 21. The loops 22 are designed to be connected to bifurcated ends 24 of a line 13 for raising and lowering the leveling device 20 along the wall of the tank T. The wheels 23 allow the frame 21 to move smoothly regardless of local irregularities in the configuration or orientation of the tank wall.

The frame 21 is provided at upper and lower portions with a plurality of magnet members 25 each having a respective screw rod 26. The screw rods 26 extend through the frame 21, so that when the screw rods 26 are turned, the magnet members 25 are moved either closer to or further from the frame 21. The spacing of the magnet members 25 from the frame 21 is adjusted to bring the magnetic force between the magnet members and the tank wall to an appropriate strength, namely, a strength which will keep the leveling device 20 in secure contact with the tank wall, despite windy conditions, but which is not so great to impede raising of the leveling device 20 by means of a manually operated winch or lowering of the leveling device 20 by means of gravity.

The frame 21 includes a projection 27 extending downwardly from an upper portion thereof, to which a joint 28 is pivotally connected, a bifurcated support rod 29 being pivotally connected to the joint 28, this arrangement constituting a universal joint so that the support rod 29 can be moved in all directions relative to the projection 27. A contact roller 30, which is larger in diameter than the wheel 23, is pivotally attached to a lower end of the support rod 29. Also, a support rod 31 is pivotally connected at an upper end to the lower end of the support rod 29, and is provided with a weight 32 at a lower end thereof. A scale 33 is perpendicularly connected to the support rod 31 above the weight 32. Generally, the graduations of the scale are located on the lower surface thereof, because, in practice, the tanks are tall structures and, therefor, the scale is viewed from below. Optionally, a spirit level (not shown) may be mounted into the scale 33, to be also visible from below, in order that one may confirm the horizontal orientation of the scale 33 when taking a reading.

As shown in FIG. 6, when the leveling device 20 is situated on a wall of the tank T, the frame 21 is attracted toward the tank T by the magnetic force of the magnet members 25. Since the contact roller 30 is larger in diameter than the wheel 23, the contact roller 30 abuts against the tank wall, even if the tank wall is partly concave. The support rod 29 is free in incline relative to the tank wall according to the configuration of the tank wall. Because the support rod 31 having the weight 32 at the bottom end is pivotally connected to the support rod 29, and the contact roller 30 is rotationally mounted coaxially with the axis about which the support rods 29, 31 are pivotally connected together, the support rod 31 is always oriented vertically and is located at a constant distance from the point on the tank wall where the contact roller 30 touches. Therefore, the scale 33 is always oriented horizontally and indicates the distance from the tank wall exactly. In accordance with the present invention, the horizontal distance from a wall is exactly obtained, and, therefore, the optical reference line method can be properly and precisely performed.

EXAMPLE

Calibration of a tank was performed by the optical reference line method using the self leveling device of the invention. Seven horizontal "lines" A–G were provided parallel to each other, in which the second "line" B from the bottom was used as a reference "line" measured by a tape. The outer circumference was divided by twenty four equally spaced vertical lines 1–24. Actually, horizontal courses of plates in the tank were used as horizontal "lines" A–G. Since the width of the course is wide, 20% and 80% positions of the height of each course were measured by the self leveling device, and the average values of the 20% and 80% positions in one horizontal "line" were calculated. In the horizontal "line" A, only 80% positions of the course were measured and the average was obtained therefrom. The deviations relative to the reference "line" (horizontal "line" B) were calculated by subtracting the average value of each horizontal "line" from the average value of the "line" B. The deviations were added to the radius at the reference "line" to determine the mean radiuses for respective horizontal "lines." The capacity of the tank (not shown) is calculated based on the radiuses of the horizontal "lines" in view of API/ASTM standards.

| | Horizontal lines | | | | | | | | | | | | |
|---|---|---|---|---|---|---|---|---|---|---|---|---|---|
| | A | B | | C | | D | | E | | F | | G | |
| Vertical lines | 80% | 20% | 80% | 20% | 80% | 20% | 80% | 20% | 80% | 20% | 80% | 20% | 80% |
| 0' | 26.85 | 26.85 | 26.00 | 27.00 | 26.85 | 26.40 | 26.25 | 26.15 | 25.95 | 25.60 | 25.85 | 26.10 | 26.40 |
| 26.2' | 28.3 | 28.6 | 28.35 | 29.2 | 29.55 | 31.1 | 32.0 | 31.5 | 30.05 | 29.9 | 29.6 | 29.7 | 29.3 |
| 52.4' | 24.1 | 24.5 | 25.2 | 25.9 | 26.2 | 26.5 | 26.2 | 25.4 | 24.8 | 25.8 | 26.2 | 26.6 | 27.7 |
| 78.5' | 22.65 | 23.02 | 23.30 | 24.10 | 24.35 | 24.35 | 24.10 | 24.00 | 23.60 | 24.20 | 24.20 | 24.20 | 24.10 |
| 104.7' | 23.7 | 23.975 | 23.9 | 23.55 | 23.7 | 23.95 | 23.3 | 23.3 | 23.0 | 22.7 | 21.7 | 22.0 | 23.9 |
| 130.9' | 22.1 | 21.90 | 21.60 | 22.20 | 22.75 | 23.25 | 23.80 | 24.30 | 24.30 | 25.30 | 25.30 | 26.0 | 26.10 |
| 157.1' | 26.15 | 26.00 | 26.30 | 25.20 | 23.60 | 23.90 | 24.50 | 24.70 | 23.70 | 24.0 | 23.5 | 22.3 | 22.0 |
| 183.3' | 23.80 | 24.45 | 23.70 | 23.50 | 22.60 | 22.75 | 22.10 | 22.00 | 21.90 | 21.90 | 21.20 | 20.70 | 21.20 |
| 209.4' | 7.95 | 8.05 | 8.2 | 8.6 | 9.35 | 10.55 | 11.35 | 11.3 | 11.5 | 12.8 | 14.5 | 16.3 | 17.4 |
| 235.6' | 20.0 | 20.06 | 19.95 | 20.15 | 20.0 | 20.3 | 20.4 | 20.25 | 20.9 | 21.0 | 21.0 | 20.2 | 20.0 |
| 261.8' | 19.275 | 19.05 | 17.6 | 17.25 | 17.3 | 16.95 | 16.4 | 16.45 | 16.3 | 16.35 | 15.65 | 14.9 | 15.0 |
| 288.0' | 21.4 | 21.55 | 20.75 | 20.7 | 21.0 | 22.0 | 22.55 | 23.35 | 23.55 | 23.7 | 23.8 | 24.4 | 25.75 |
| 314.2' | 22.3 | 22.2 | 22.5 | 22.75 | 22.3 | 22.8 | 22.7 | 22.1 | 22.0 | 22.5 | 22.0 | 22.6 | 23.9 |
| 340.3' | 20.25 | 20.25 | 20.75 | 21.4 | 21.9 | 22.2 | 22.9 | 23.5 | 24.2 | 26.4 | 27.2 | 26.6 | 27.5 |
| 366.5' | 22.15 | 21.60 | 21.0 | 21.1 | 20.75 | 20.4 | 19.9 | 19.35 | 19.3 | 20.3 | 19.5 | 20.1 | 20.25 |
| 392.7' | 19.95 | 20.15 | 20.1 | 20.6 | 20.95 | 21.5 | 21.9 | 22.4 | 21.95 | 22.4 | 22.6 | 23.1 | 23.0 |
| 418.9' | 22.825 | 23.5 | 22.8 | 23.2 | 23.1 | 23.4 | 23.3 | 22.65 | 22.3 | 23.1 | 23.2 | 23.75 | 23.5 |
| 445.1' | 15.75 | 16.0 | 15.6 | 15.5 | 15.5 | 15.8 | 16.2 | 16.3 | 16.3 | 16.4 | 16.2 | 16.7 | 18.5 |
| 471.2' | 19.95 | 20.1 | 19.8 | 19.75 | 19.75 | 20.2 | 20.4 | 19.8 | 18.6 | 18.2 | 16.0 | 15.5 | 14.8 |
| 497.4' | 24.9 | 25.15 | 25.4 | 25.6 | 25.75 | 25.9 | 24.75 | 24.5 | 23.9 | 23.8 | 23.8 | 24.4 | 23.9 |
| 523.6' | 22.8 | 23.85 | 24.9 | 25.6 | 25.8 | 26.2 | 27.1 | 28.0 | 24.75 | 31.4 | 31.25 | 31.8 | 32.6 |
| 549.8' | 23.3 | 24.0 | 23.0 | 22.6 | 22.7 | 23.6 | 24.5 | 24.4 | 23.9 | 23.6 | 23.8 | 24.5 | 26.2 |
| 576.0' | 18.0 | 17.1 | 16.5 | 15.45 | 15.65 | 15.9 | 14.75 | 13.2 | 12.5 | 11.5 | 9.4 | 9.1 | 9.25 |
| 602.1' | 5.7 | 5.3 | 4.7 | 5.6 | 5.6 | 4.8 | 4.7 | 4.8 | 5.5 | 8.3 | 9.1 | 7.8 | 7.9 |
| TOTALS | 504.55 | 507.925 | 501.9 | 506.5 | 507 | 514.6 | 516.05 | 514.2 | 510.75 | 521.15 | 516.55 | 519.65 | 530.4 |
| AVERAGE | 21.022917 | 21.038021 | | 21.114583 | | 21.471875 | | 21.353125 | | 21.61875 | | 21.076042 | |
| DEVIATION | .015104 | 0 | | −.076562 | | −.433854 | | −.315104 | | −.586729 | | −.838021 | |
| | a | b | | c | | d | | e | | | | | |

-continued

| Horizontal line | (FEET) REFERENCE CIRC. | (FEET) REFERENCE RADIUS | (CM) RADIUS DEVIATION | (FEET) CORRECTED RADIUS | (FEET) CORRECTED CIRC. |
|---|---|---|---|---|---|
| A | 628.99 | 100.08757 | +.015104 | 100.08806 | 628.553 |
| B | 628.55 | 100.08757 | 0 | 100.08757 | 628.550 |
| C | 628.55 | 100.08757 | −.076562 | 100.08506 | 628.534 |
| D | 628.55 | 100.08575 | −.433854 | 100.07334 | 628.461 |
| E | 628.55 | 100.08757 | −.315104 | 100.07724 | 628.485 |
| F | 628.55 | 100.08757 | −.580729 | 100.06852 | 628.430 |
| G | 628.55 | 100.08757 | −.838021 | 100.06008 | 628.377 | a = reference circ. taken on horizontal line B.

b = $\frac{a}{2 \times \pi}$ = reference radius.

c = average radial deviation on each horizontal line d = b + $\frac{c}{2.54 \times 12}$ = corrected radius.

e = d × 2 × π = corrected circumference on each ring.

While the invention has been explained with reference to a specific embodiment of the invention, the explanation is illustrative and the invention is limited only by the appended claims.

What is claimed is:

1. A self leveling device adapted to be moved along a substantially vertical wall comprising,
    a base assembly adapted to be moved up and down along and adjacent to the vertical wall,
    a roller assembly pivotally connected to said base assembly and being adapted to be in continuous contact with the vertical wall as the base assembly is being moved up and down along and adjacent to the vertical wall,
    weight means pivotally connected to said roller assembly, and
    a horizontal member connected to said weight means perpendicular to an imaginary vertical line extending through the weight means.

2. A self leveling device according to claim 1, in which said base assembly comprises a frame adapted to be connected to a line for moving the frame up and down, and at least two wheels rotationally connected to said frame for smoothly moving the frame along and adjacent to the vertical wall at a predetermined distance from the vertical wall.

3. A self leveling device according to claim 2 adapted for use when the vertical wall is comprised of a ferromagnetic material, in which said base assembly further comprises magnet members for biasing the frame toward the vertical wall by magnetic force, and means to adjust the spacing of the magnet members from the wall to regulate the magnetic force between the magnet members and the vertical wall.

4. A self leveling device according to claim 2, in which said roller assembly comprises a roller support pivotally connected to said frame, and a contact roller rotationally connected to said roller support, said contact roller being larger in diameter than the wheels of the base assembly so that the contact roller is adapted to be in continuous contact with the vertical wall.

5. A self leveling device according to claim 4, in which said roller assembly further comprises a universal joint for connecting the roller support to the frame so that the roller assembly depends downwardly from the universal joint, under the influence of gravity, when the device is in use on a vertical wall.

6. A self leveling device according to claim 4, in which said weight means comprises a weight support pivotally connected to said roller support, and a weight element connected to a bottom end of said weight support.

7. A self leveling device according to claim 6, in which said horizontal member is a scale and is connected to the weight support adjacent to the contact roller, so that the scale is always located at a constant distance from the vertical wall regardless of the configuration of the vertical wall.

8. A self leveling device adapted to be moved substantially vertically along a wall of a tank constituted of a ferromagnetic material for determining the configuration thereof comprising,
    a base assembly adapted to be moved vertically along the tank wall, said base assembly including a frame, at least two wheels rotationally connected to said frame, and magnet members attached to the frame adapted for urging the frame toward the tank wall so that the base assembly can be moved by the wheels up and down the wall, regardless of the contour of the wall,
    a roller assembly including a roller support pivotally connected to said frame, and a contact roller rotationally connected to said roller support, the contact roller being adapted to be in continuous contact with said tank wall,
    weight means pivotally connected to said roller support of the roller assembly, and
    a horizontal member connected to said weight means perpendicular to an imaginary vertical line extending through the weight means.

9. A self leveling device according to claim 8, in which said weight means comprises a weight support pivotally connected to said roller support, and a weight element connected to the bottom end of said weight support.

10. A self leveling device according to claim 9, in which said horizontal member is a scale adapted to be read by an optical instrument located outside the tank, said scale being connected to the weight support adjacent to the contact roller so that the scale is always located at a constant distance from the tank wall regardless of the configuration of the wall.

* * * * *